United States Patent [19]
Fello et al.

[11] Patent Number: 5,293,522
[45] Date of Patent: Mar. 8, 1994

[54] GROUND FAULT CIRCUIT BREAKER WITH TEST SPRING/CONTACTS DIRECTLY MOUNTED TO TEST CIRCUIT OF PRINTED CIRCUIT BOARD

[75] Inventors: Joseph P. Fello, Penn Hills Township, Allegheny County; Umesh C. Patel, Bridgeville; Michael J. Whipple, New Sewickley; Garry B. Theadore, Patterson, all of Pa.

[73] Assignee: Westinghouse Electric Company, Pittsburgh, Pa.

[21] Appl. No.: 943,801

[22] Filed: Sep. 11, 1992

[51] Int. Cl.5 .............................. H01H 73/00
[52] U.S. Cl. ........................ 335/18; 361/42; 361/17

[58] Field of Search ............... 335/18, 17; 361/42–48

[56] References Cited

U.S. PATENT DOCUMENTS 3,566,318 12/1968 Gelzheiser et al. .
4,081,852 3/1978 Coley et al. .
4,686,600 8/1987 Morris et al. ..................... 335/18

*Primary Examiner*—Lincoln Donovan

[57] ABSTRACT

A ground fault circuit breaker in which both the fixed and movable contacts of the ground fault test switch are directly secured to the printed circuit board on which the ground fault detection circuit is implemented, with the movable contact also providing the spring bias for the test button.

6 Claims, 5 Drawing Sheets

GROUND FAULT CIRCUIT BREAKER WITH TEST SPRING/CONTACTS DIRECTLY MOUNTED TO TEST CIRCUIT OF PRINTED CIRCUIT BOARD

CROSS REFERENCE TO RELATED APPLICATIONS

U.S. Ser. No. 07/676,150, filed on Mar. 27, 1991 and entitled DUAL WOUND TRIP SOLENOID.

Commonly owned U.S. patent application Ser. No. 943803 entitled CIRCUIT BREAKER WITH AUXILIARY SWITCH ACTUATED BY CASCADED ACTUATING MEMBERS concurrently filed in the names of Joseph P. Fello and Michael J. Whipple U.S. patent application Ser. No. 943670 entitled GROUND FAULT CIRCUIT BREAKER WITH FLAT BUS BARS FOR SENSING COILS concurrently filed in the names of Joseph Joseph P. Fello, William E. Smith, Wilbert E. Lindsay and Michael J. Whipple; and U.S. patent application Ser. No. 943796 entitled INSULATING BARRIERS FOR CIRCUIT BREAKER BUS BARS AND A GROUND FAULT CIRCUIT BREAKER INCORPORATING SAME concurrently filed in the names of Michael J. Whipple and Joseph P. Fello.

BACKGROUND OF THE INVENTION

1. Field of the Invention

This invention relates to ground fault circuit breakers, and more particularly to the contacts for a ground fault test circuit on a printed circuit board which also serves as the spring for the test button.

2. Background Information

Ground fault circuit breakers combine a conventional circuit breaker which responds to overcurrent conditions and short circuits with a ground fault detection circuit which trips the breaker in response to ground faults. The addition of the ground fault detector to the conventional small circuit breaker used in residential and light commercial and industrial applications is complicated by the limited space available in such breakers which are designed for installation in a standardized load center or panel board.

U.S. Pat. No. 4,081,852 discloses such a ground fault circuit breaker in which the circuit breaker mechanism is mounted in one compartment within a molded housing and the ground fault detector is mounted in an adjacent compartment. In the '852 patent, the ground fault detector includes a test circuit activated by a test button for testing the operation of the ground fault detector. The ground fault detector is constructed of a number of discrete components including a leaf spring contact which biases a test button to the off position. This movable contact and the fixed test button contact are connected to the other components in the test circuit through discrete wires.

Commonly owned U.S. patent application Ser. No. 676,150, filed on Mar. 27, 1991 and entitled "Dual Wound Trip Solenoid" discloses a two pole ground fault circuit breaker in which the ground fault detector circuit is implemented on a printed circuit board mounted in a compartment within the molded housing. The spring contact for the ground fault test button of this circuit breaker is similar to that in the '852 patent and is connected to the components on the printed circuit board through discrete wires.

There is a need to simplify the design of these mass-produced ground fault circuit breakers to reduce component and labor costs. This includes simplifying the ground fault test circuit.

SUMMARY OF THE INVENTION

These and other needs are satisfied by the invention which is directed to a ground fault circuit breaker in which the ground fault detection circuit is implemented on a printed circuit board, and wherein a fixed contact member and a resiliently deformable movable contact member, which also serves as a spring mount for the test button, are both directly mounted on the printed circuit board. More particularly, the resiliently deformable movable contact member comprises an electrically conductive metallic strip secured along a side edge at a first end to the printed circuit board. Preferably, this electrically conductive metallic strip has a base section extending from the first end secured to the printed circuit board, and a terminal section bent at an angle, preferably about 90°, to the base section and terminating in a free end which contacts the fixed contact member when the test button is depressed. Also preferably, the fixed contact member is an electrically conductive strip secured along a side edge at a first end to the printed circuit board with a base section spaced from the base portion of the movable electrical contact, and a terminal portion generally parallel to or angled slightly toward, but spaced from the terminal portion of the electrically conductive metallic strip of the movable contact.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be shown as applied to a single pole residential or light commercial or industrial ground fault circuit breaker; however, it will be evident to those skilled in the art that the invention is also applicable to multi-pole circuit breakers as well.

Figure 1:
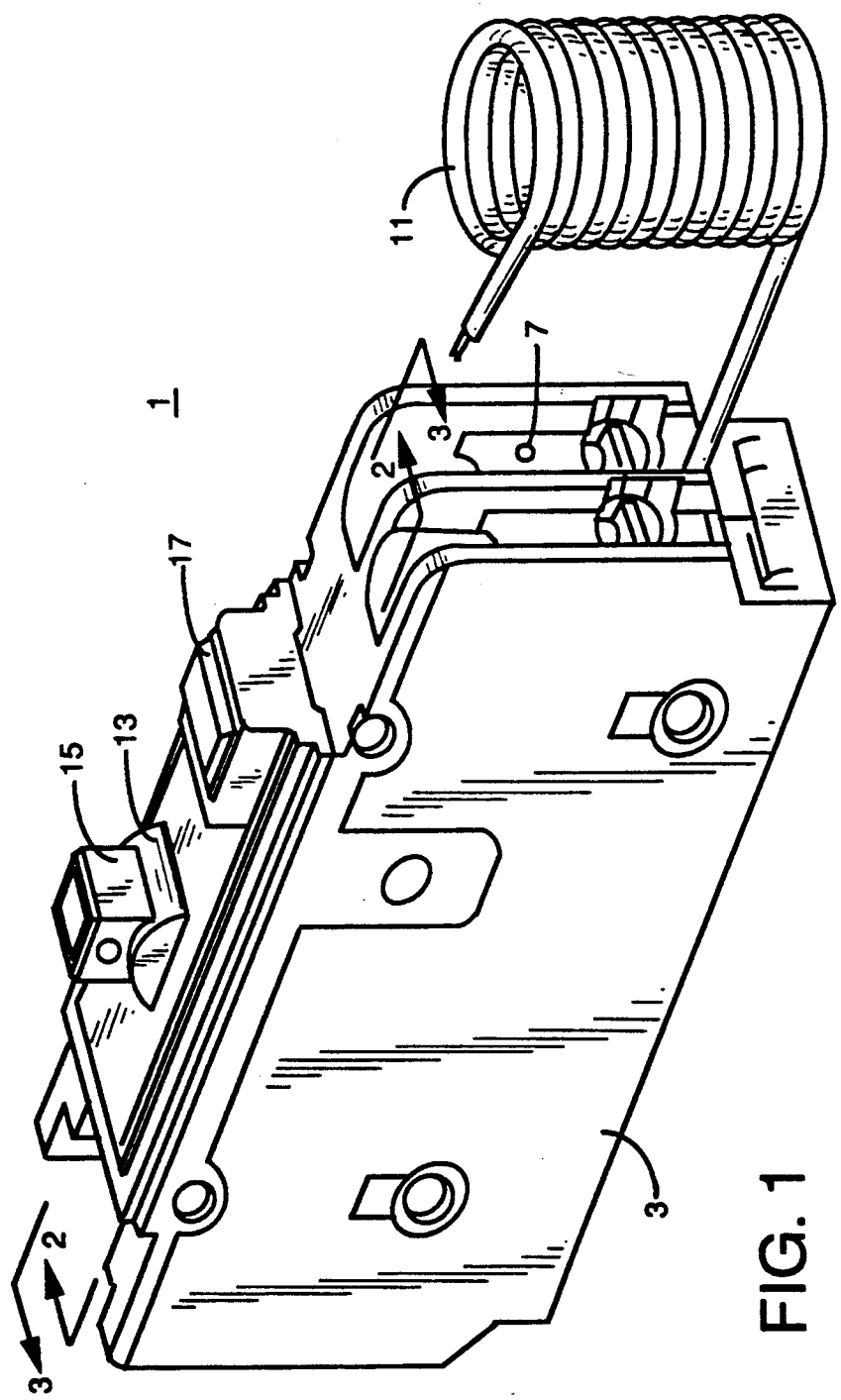
FIG. 1 is an isometric view of a ground fault circuit breaker to which the invention has been applied.

Referring to FIG. 1, the ground fault circuit breaker 1 comprises a housing 3 which is composed of electrically insulating material such a thermo-setting resin. A load terminal 5 and load neutral terminal 7 are provided for connecting the circuit breaker to a load. A line terminal 9 (see FIG. 2) is provided at the opposite end of the housing 3 for connection to a commercial power system. The line side of the neutral is connected to a pigtail 11. The ground fault circuit breaker 1 includes an operating member 13 having an integral molded handle 15 extending through the housing 3. A ground fault test switch 17 is also accessible through the housing.

Figure 2:
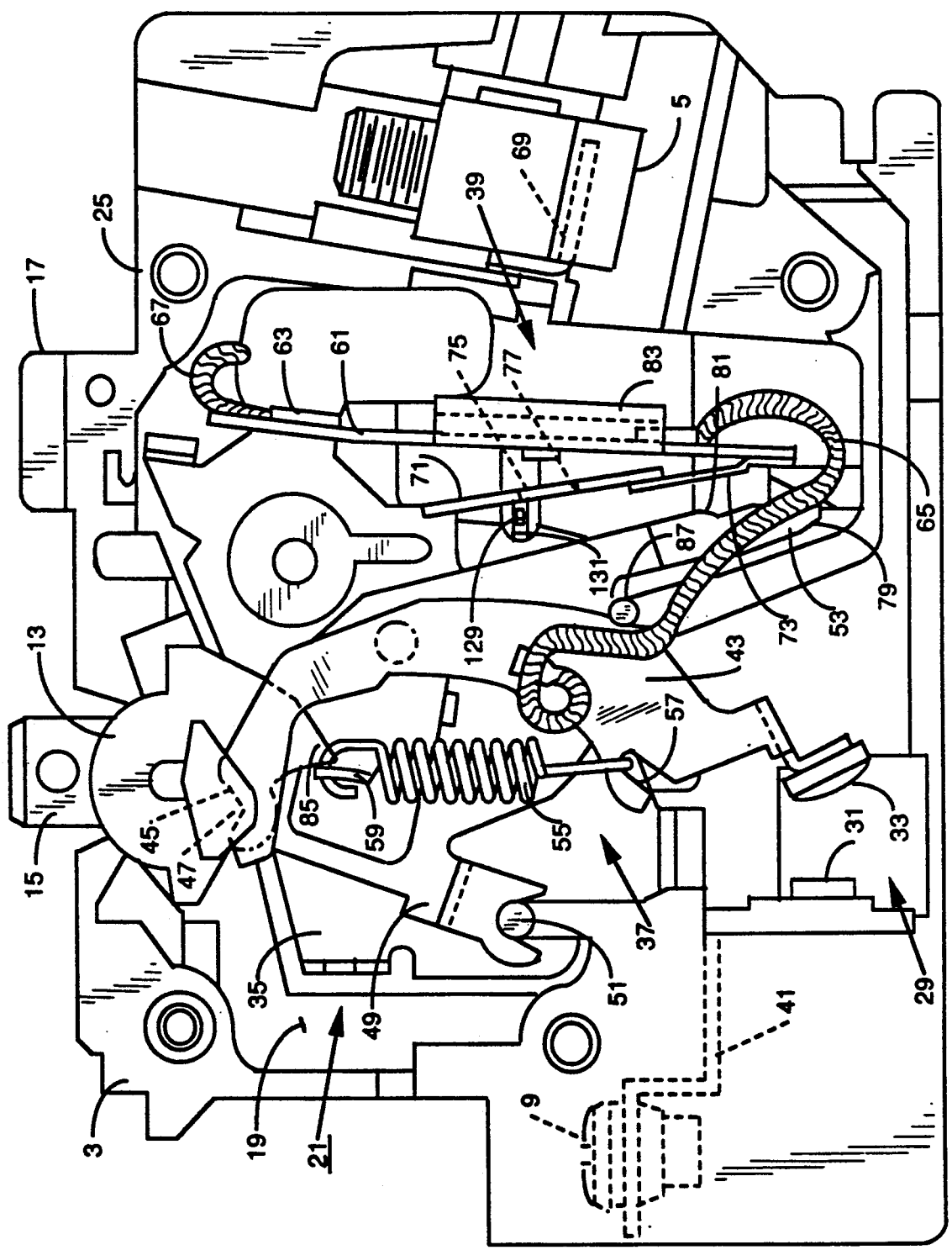
FIG. 2 is a vertical section taken along the line 2—2 through the circuit breaker of FIG. 1.
Figure 3:
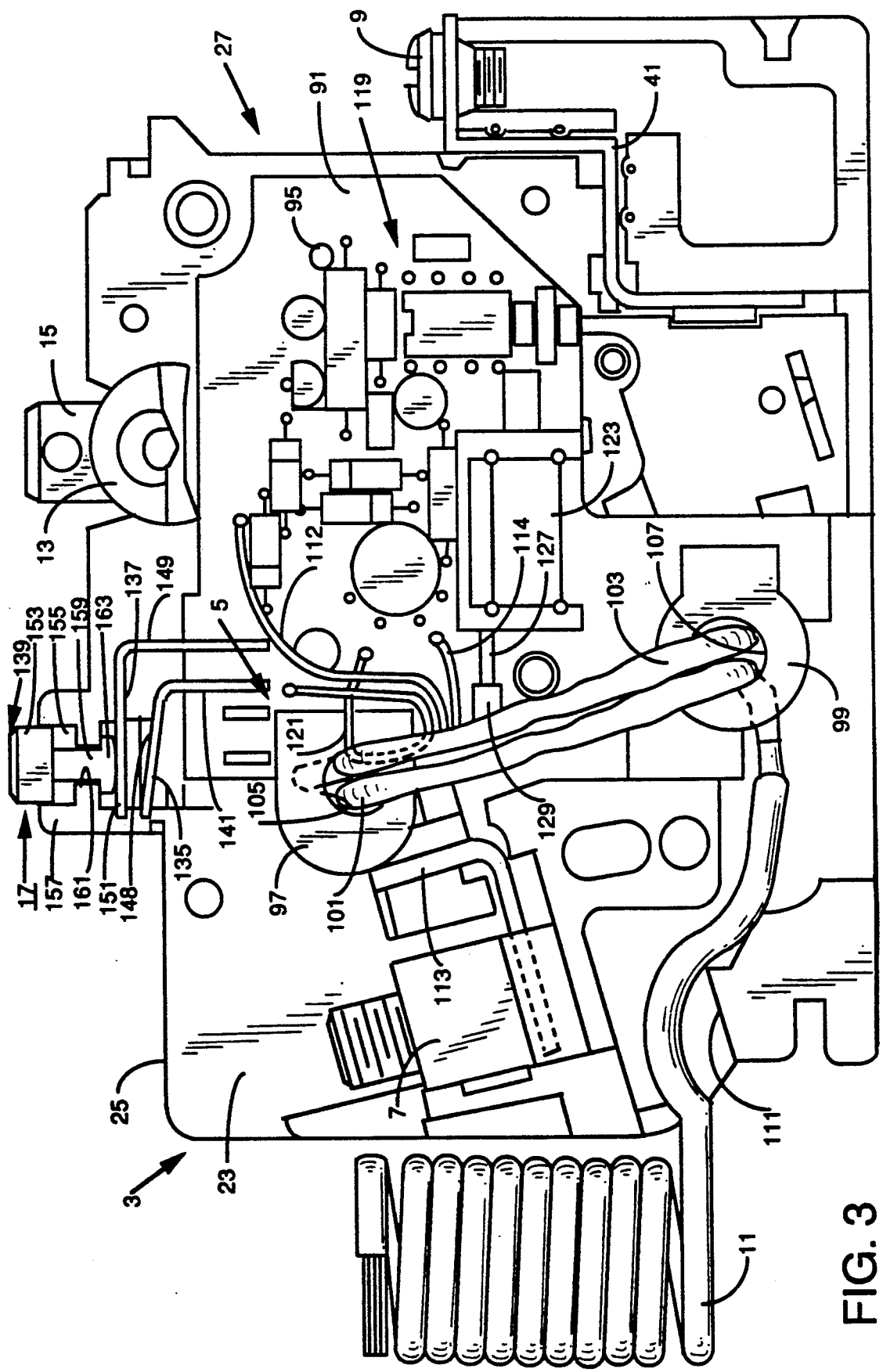
FIG. 3 is another vertical section through the circuit breaker of FIG. 1 taken along line 3—3.

The housing 3 defines a compartment 19 (see FIG. 2) in which a circuit breaker mechanism 21 is housed, and a second compartment 23, separated from the compartment 19 by a center panel 25, which houses a ground fault circuit interrupter 27 (see FIG. 3).

The circuit breaker mechanism 21 is of the type disclosed in U.S. Pat. No. 3,566,318 which is hereby incorporated by reference for a complete description of the structure and its operation. Briefly, the circuit breaker mechanism 21 includes a pair of separable contacts 29, including a fixed contact 31 and a movable contact 33, a supporting metal frame 35, an operating mechanism 37, and a trip device 39. The fixed contact 31 is connected by a conductor 41 to the line terminal 9.

The operating mechanism 37 includes a flat electrically conductive generally C-shaped contact arm 43 to which the movable contact 33 is secured at the lower end. The upper end of the contact arm has a notch 45 which is biased against a projection 47 on the operating m 13 in a manner to be discussed. The operating member 13 is mounted in the housing 3 for rotation about an axis perpendicular to the plane of FIG. 2. Motion is transmitted from the operating member 13 to the contact arm 43 when the circuit breaker 1 is manually operated, and from the contact arm 43 to the operating member 13 when the breaker is automatically tripped.

The operating mechanism 37 further includes a latchable cradle 49 which is pivotally supported at one end by a pivot 51 molded into the center panel 25. The other end 53 of the cradle 49 is latched by the trip device 39 in a manner to be discussed.

As more specifically described in U.S. Pat. No. 3,254,176, the ends of the latchable cradle 49 are offset and disposed along a plane which is parallel to a plane in which the main body portion of the latchable cradle 49 is disposed. This places the ends of the cradle 49 in the same plane as the C-shaped contact arm 43. A spring 55 is connected, under tension, at one end in a slot 57 near the lower end of the C-shaped contact arm 43, and at the other end to a bent over tab 59 projecting outward from the main body of the latchable cradle 49.

The trip device 39 includes a bimetal 61 secured at an upper end to a bent over tab 63 on the frame 35. The contact arm 43 of the operating mechanism 37 is connected to the lower end of the bimetal 61 by a flexible conductor 65. The upper end of the bimetal 61 is connected by another flexible conductor 67 to the ground fault detector discussed below which in turn is connected to a tang 69 extending through an opening in the end wall of the housing 3. The load terminal 5 is connected to the external end of the tang 69 for connection of the circuit breaker to a load. The closed circuit through the circuit breaker 1 extends from the line terminal 9 conductor 41 fixed contact 31, movable contact 33, contact arm 43, flexible conductor 65, bimetal 61, flexible conductor 67, the ground fault detector, tang 69, and load terminal 5.

The trip device 39 further includes an elongated, rigid magnetic armature or latch member 71 mounted on a spring 73 which is welded to the free lower end of the bimetal 61. The magnetic armature 71 extends generally upward along side the bimetal 61, and has an opening 75 forming a latch surface 77 at the base of the opening. The latch end 53 of the cradle 49 is formed with a latch surface 79 and a stop surface or Fulcrum part 81. The armature 71 serves as a stop to engage the fulcrum part 81 of the latchable cradle 49 in the latched position of the cradle. A U-shaped magnetic member 83 is secured to the bimetal 61 adjacent the magnetic armature 71 to concentrate the flux created by current flowing through the bimetal.

The circuit breaker is shown in FIG. 2 in the tripped position. The cradle 49 is latched for resetting the circuit breaker by rotating the handle 15 clockwise, as shown in FIG. 2. This causes a projection 85 on the operating member 13 to engage the tab 59 and rotate the latchable cradle 49 in the counterclockwise direction until the latch end 53 is latched in the opening 75 in the magnetic armature 71. This operation is shown in detail in U.S. Pat. No. 3,566,318.

The separable contacts 29 are closed by moving the handle 15, with the cradle 49 latched, in the counterclockwise direction as viewed in FIG. 2 to the on position. This causes the projection 47 on the operating member 13 which engages the notch 45 in the contact arm 43 to move the upper end of the contact arm to the right of the line of action of the spring 55 resulting in closure of the contacts 29. The contacts 29 could be manually opened from this closed position by rotating the handle 15 clockwise, as viewed in FIG. 2, to the off position.

The trip device 39 provides overcurrent protection through the bimetal 61. Prolonged currents above the rated current of the circuit breaker heats the bimetal 61 causing the lower end to deflect to the right, as shown in FIG. 2, thereby unlatching the cradle 49, as the armature 71 pivots about the fulcrum 81 until the latch surface 79 on the latch end 53 of the cradle slides off of the latch surface 77. When unlatched, the cradle 49 is rotated clockwise by the spring 55 until it engages a stop pin 87 molded in the center panel 25 of the circuit breaker housing. During this movement, the line of action of the spring 55 moves to the right of the pivot formed by the notch 45 in the contact arm and the projection 47 on the operating member 13, whereupon the spring 55 biases the contact arm 43 in the opening direction to open the contacts 29 and moves the contact arm 43 so that the line of action of the force exerted by the spring on the operating member 13 shifts across the rotational axis of the operating member 13 and actuates the operating member to the tripped position shown in FIG. 2. The tripped position of the operating member 13 is intermediate the "on" and "off" positions. The operating member 13 is stopped in the intermediate or tripped position seen in FIG. 2 when the projection 85 engages the tab 59 on the cradle 49. The contact arm 43 is stopped in the open position seen in FIG. 2 when it engages the stop pin 87. The circuit breaker is reset following the trip in the manner discussed above.

The trip device 39 also provides short circuit protection. The very high current through the bimetal 61 produced by a short circuit induces a magnetic flux which is concentrated by the magnetic member 83 and of sufficient magnitude to attract the armature 71 to the magnetic member, thereby unlatching the cradle 49 to trip the circuit breaker.

As discussed, the circuit breaker 1 also provides ground fault protection, both for line to ground faults and neutral to ground faults. All the components for ground fault protection are mounted on a printed circuit board 91 in the compartment 23 formed in the molded housing 3 as shown in FIG. 3. The printed circuit board 91 is positioned within the compartment 23 by a pin 95 molded into the center panel 25. A suitable ground fault protection circuit is the well-known dormant oscillator-type such as disclosed in U.S. patent application Ser.

No. 07/676,150 referred to above. This circuit includes two transformers formed by toroidal sensing coils 97 and 99. The primaries of the transformers are formed by passing a neutral conductor 101 and a line lead 103 which pass through the central opening 105 and 107 in the sensing coils 97 and 99, respectively. The lower end of the neutral 101 is welded to the end of the pigtail 11 extending through an opening 111 in the housing 3 for connection to a panel neutral. The upper end of the neutral lead 101 is connected to the printed circuit board by a lead 112 and to a tang 113 leading to the load neutral terminal 7. The lower end of the line lead 103 is connected to the flexible conductor 67 leading from the bimetal 61 and by lead 114 to the printed circuit board, while the upper end is connected through an opening in the central panel 23 to the tang 69 leading to the load terminal 5. The windings T1 and T2 on the toroidal sensing coils 97 and 99 form the secondaries of the transformers.

Figure 4:
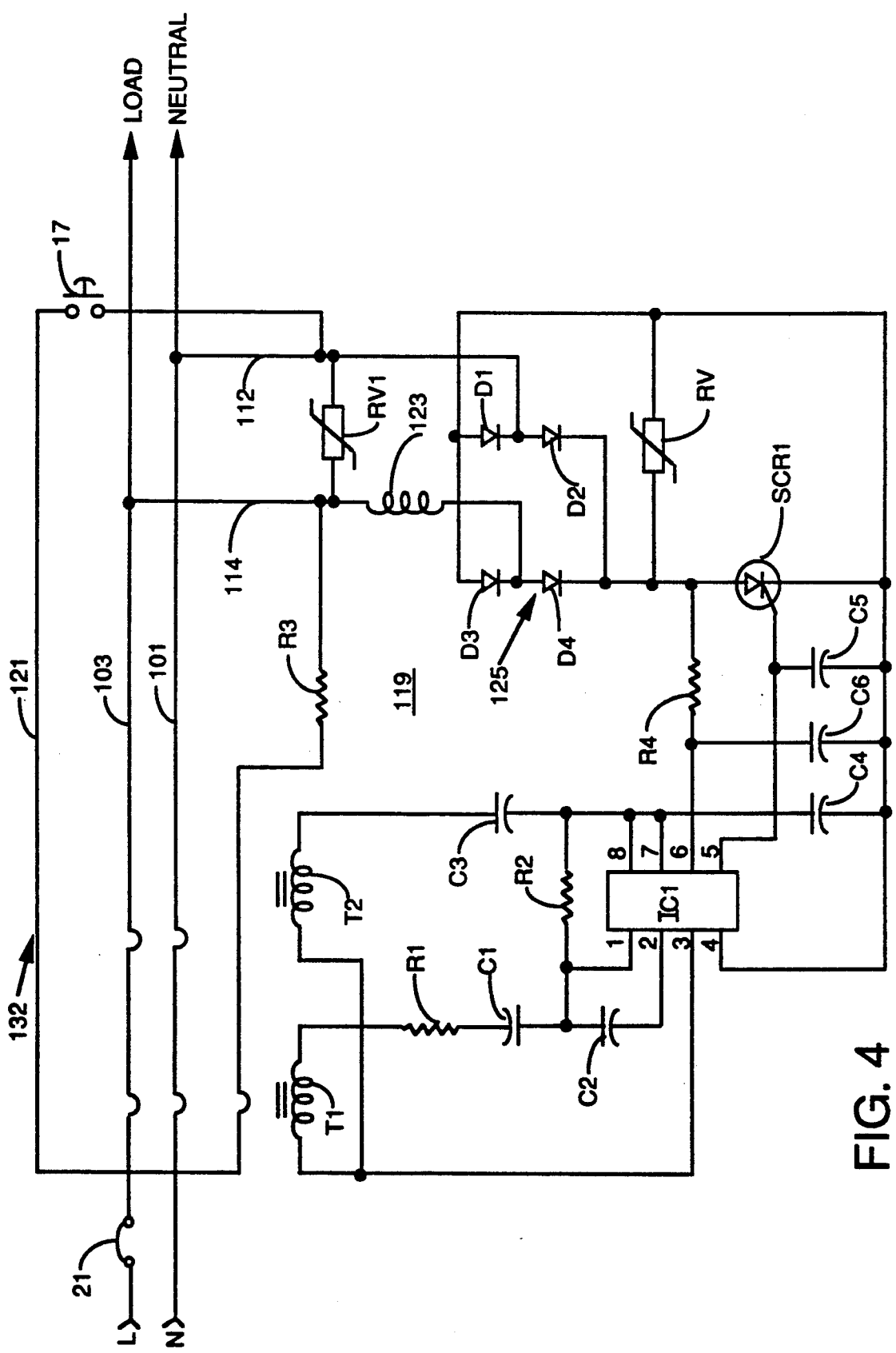
FIG. 4 is a schematic circuit diagram of the ground fault detector which forms part of the circuit breaker of FIGS. 1-3.

The schematic diagram of the circuit 119 of the ground fault detector which is mounted on the printed circuit board 91 is illustrated in FIG. 4. The circuitry 119 includes the sensing toroids 97 and 99 with secondary windings T1 and T2, respectively. As previously discussed, the line conductors 103 as well as the neutral conductor 101, are routed through the toroids 97 and 99. Additionally, a test conductor 121 is routed through the upper toroid 97.

The toroid 97 is used for sensing ground faults. During normal conditions, the magnetic fields generated by the conductor 103 and the neutral conductor 101 cancel and therefore do not induce a voltage on the secondary winding T1 of the toroid 97. However, during a ground fault condition, there will be a resultant magnetic field which will induce a voltage in the secondary winding T1 which, in turn, will energize a trip solenoid 123 by way of a ground fault interrupter integrated circuit IC1, as discussed below.

The toroid 99 is used in conjunction with the toroid 97 for sensing a grounded neutral condition. As discussed in Linear Integrated Circuits 1989 by Raytheon Corporation, Section 10 on pages 10-16 through 10-21, hereby incorporated by reference, a grounded neutral will close a magnetic path between the toroids 97 and 99. The resultant AC coupling closes a feedback path around an operational amplifier in the IC1 causing the operational amplifier to oscillate. When the peaks of the oscillation voltage exceed an CR trigger comparator threshold within the IC1, the IC1 output will go high. Circuitry for detecting a grounded neutral condition is also disclosed in Reissue Patent No. 30,678, hereby incorporated by reference.

The secondary windings T1 and T2 of the toroids 97 and 99, respectively, are applied to a low power ground fault interrupter integrated circuit IC1, such as a Raytheon RV4145 or a TRC-10020 by Technology Research Corporation of Clearwater, Fla. More specifically, one side of the secondary winding T1 is applied to pin 3 of the integrated circuit IC1. The other side of the secondary winding T1 is applied to pin 1 of the IC1 by way of the resistor R1 and serially coupled capacitor C1. A resistor R2 is connected between pins 1 and 8 of the integrated circuit IC1. The resistors R1 and R2 determine an amplification factor for an operational amplifier within the integrated circuit IC1. Exemplary values for the resistors R1 and R2 are 150 ohms and 1 megohm, respectively. The capacitor C1 which may be, for example, 15 microfarads acts as a coupling capacitor. A noise capacitor C2, for example, 0.01 microfarads is connected between pins 1 and 2 of the integrated circuit IC1.

One side of the secondary winding T2 is connected to the secondary winding T1 that is connected to pin 3 of the integrated circuit IC1. The other side of the secondary winding T2 is connected to a tuning capacitor C3, for example, 1 microfarad. The other side of the tuning capacitor C3 is connected to the resistor R2, pins 7 and 8 of the integrated circuit IC1 as well as to a noise capacitor C4, for example, 0.01 microfarads. The other side of the noise capacitor C4 is connected to pin 4 of the integrated circuit IC1.

The winding of the trip solenoid 123 is connected on one end to the line conductor 103 with the other end connected to a full wave rectifier, generally indicated by the reference numeral 125, and including the diodes D1, D2, D3 and D4. The dc output of the full wave rectifier 125 is connected across a silicon controlled rectifier SCR 1. The gate terminal of the silicon controlled rectifier SCR 1 is connected to pin 5 of the integrated circuit IC1. A noise capacitor C5, for example 6.8 microfarads is connected between the gate terminal of the silicon controlled rectifier SCR 1 an pin 4 of the integrated circuit IC1 to prevent spurious triggering of the silicon controlled rectifier SCR 1.

A resistor R4, for example 30 kilohms, is connected between full wave rectifier 132 and pin 6 of the integrated circuit IC1. This resistor R6 limits the current to the shunt regulator within the integrated circuit IC1. Surge protective devices, such as the varistors RV1 and RV2 are used to protect the circuit from overvoltage.

In operation, upon detection of a grounded load conductor or a grounded load neutral conductor by the toroids 97 or 99, a voltage is induced in the secondary windings T1 and T2. This voltage, in turn, is applied to the integrated circuit IC1. During such conditions,. pin 5 of the integrated circuit IC1 enables the gate terminal to fire the silicon controlled rectifier SCR 1, which, in turn, energizes the trip solenoid 123. Energization of the trip solenoid 123 results in extension of the solenoid plunger 127. A flag 129 secured to the plunger extends through a slot 131 in the center panel 25 and pushes the armature 71 to the right as viewed in FIG. 2 to trip the circuit breaker thereby opening the separable contacts 29.

In order to allow for periodic verification of the operation of the circuitry, a test circuit 132 is provided which includes the test switch 17, accessible from the outside of the housing 3 as seen in FIG. 1. More specifically, the test wire 121 is connected between the load neutral conductor 101 and the load conductor 103 by way of the test switch 17, and a resistor R3, for example 15 kilohms, and is routed through the toroid 97 (FIG. 3) to induce a signal in the secondary winding T1 to simulate a ground fault condition. Upon actuation of the test button 17, a ground condition is simulated, resulting in a trip of the circuit breaker through energization of the trip solenoid 123.

Figure 5:
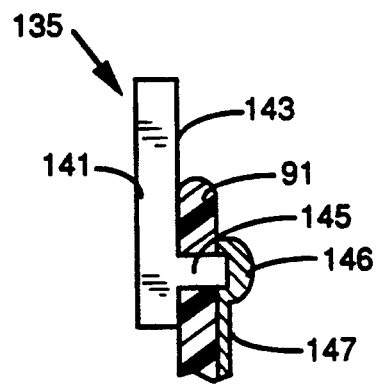
FIG. 5 is a fragmentary cross-sectional view through a portion of FIG. 3 taken along to line 5—5.
Figure 6:
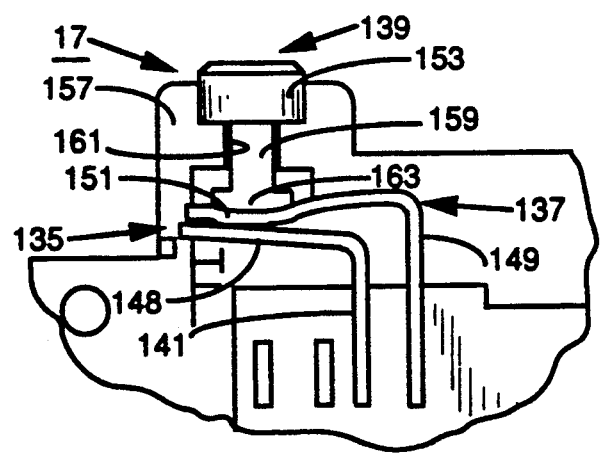
FIG. 6 is a fragment of FIG. 3 showing the test switch of the invention in the actuated position.

Referring to FIGS. 3, 5 and 6, the test switch 17 includes a fixed contact 135, a movable contact 137 and a test button 139. The fixed contact 135 and the movable contact 137 each comprise an electrically conductive metallic strip, such as a copper strip. The metallic strip of the fixed contact 135 has a base section 141 which is secured along a side edge 143 to the printed circuit board by a laterally extending projection 145 which extends through the printed circuit board and is soldered in place on the back of the printed circuit board. The solder joint 146 also electrically connects the fixed contact 135 to a lead trace 147 in the test circuit of the printed circuit board. The fixed contact has a terminal section 148 contilevered laterally from the end of the base section 141. The movable contact 137 similarly has a base section 149 and a terminal section 151 and is similarly secured along the side edge of the base section 149 to the printed circuit board. The fixed and movable contacts 135 and 137 are nested in spaced relation with the base portions substantially parallel. The terminal section 151 of the movable contact 137 extends at substantially a right angle to the base section 149, while the angle between the base section and terminal section of the fixed contact is slightly greater than a right angles so that the terminal section 148 angles slightly toward the terminal section 151 of the movable contact 137.

The test button 139 includes an enlarged head portion 153 which is received in a recess 155 in an upwardly extending bass 157 molded into the housing 3. A stem 159 on the underside of the head 153 extends through a guide opening 161 in the housing 3 and terminates and an enlarged terminal portion 163. The terminal section 151 of the movable contact 137, which is resiliently deformable, being made of copper, bears against the terminal portion 163 and biases the button to the full upward or unactuated position shown in FIG. 3. The button 139 is retained by the terminal portion 163 which bears against the portion of the housing 3 forming the guide opening 161. With the test switch 17 in its unactuated position, the test circuit 119 is open circuited. When the ground fault detector is to be tested, the test button 139 is depressed thereby resiliently deforming the movable contact 137 to bring it into electrical contact with the fixed contact 135 to complete the test circuit as shown in FIG. 6.

While specific embodiments of the invention have been described in detail, it will be appreciated by those skilled in the art that various modifications and alternatives to those details could be developed in light of the overall teachings of the disclosure. Accordingly, the particular arrangements disclosed are meant .to be illustrative only and not limiting as to the scope of the invention which is to be given the full breadth of the appended claims and any and all equivalents thereof.

What is claimed is:

1. A ground fault circuit breaker comprising:
   at least one pair of separable power contacts;
   tripping means for tripping said separable power contacts open in response to selected current conditions;
   ground fault detection means including a printed circuit board, ground fault detection circuit means for detecting a ground fault condition and including a ground fault test circuit mounted on said printed circuit board, and actuating means responsive to detection of said ground fault conditions actuating said tripping means; and
   test means comprising:
   a fixed contact member directly mounted on and supported by said circuit board and electrically connected to said ground fault test circuit;
   a resiliently deformable movable contact member having a first end directly mounted on and supported by said printed circuit board and electrically connected to said ground fault test circuit; and
   a test button biased to an off position by said resiliently deformable movable contact member and depressible to resiliently deform said resiliently deformable movable contact member to contact said fixed contact member to complete said ground fault test circuit.

2. The ground fault circuit breaker of claim 1 wherein aid resiliently deformable movable contact member comprises a first electrically conductive metallic strip secured along a side edge at said first end to said printed circuit board.

3. The ground fault circuit breaker of claim 2 wherein said first electrically conductive metallic strip of said resiliently deformable movable contact member has a base section extending from said first end, and a terminal section bent at an angle to said first section and terminating in a free end which contacts said fixed contact member when said test button is depressed.

4. The ground fault circuit breaker of claim 3 wherein said angle is substantially a right angle.

5. The ground fault circuit breaker of claim 3 wherein said fixed contact member comprises a second electrically conductive metallic strip secured along a side edge at a first end to said printed circuit board, and having a free end spaced from, but contacted by said free end of said first electrically conductive metallic strip when said test button is depressed.

6. The ground fault circuit breaker of claim 5 wherein said second electrically conductive metallic strip of said fixed contact member nests with said first electrically conductive metallic strip of said resiliently deformable movable contact member and has a base section generally parallel too but spaced from the base portion of said first electrically conductive metallic strip, and a terminal portion generally parallel to, but spaced from the terminal portion of said first electrically conductive metallic strip.

* * * * *